UNITED STATES PATENT OFFICE 2,508,875

MODIFIED MELAMINE RESINS

Milton J. Scott, Springfield, Mass., assignor to Monsanto Chemical Company, St. Louis, Mo., a corporation of Delaware No Drawing. Application December 24, 1946, Serial No. 718,263

11 Claims. (Cl. 260—67.6)

This invention relates to new surface coating resins. More particularly, the invention relates to melamine resins modified with aryl sulfonamides.

The reaction products of methylol melamines with alcohols have become important in the synthetic coating field, particularly in combination with conventional surface coating resins. The modified methylol melamines speed the curing of the conventional resins and improve their color retention, chemical resistance and abrasion resistance. However, the known alcohol-modified methylol melamines have limited compatibility with other surface coating resins and when used in large enough quantity to effect maximum improvement of said resins, the gloss of the final coating is seriously impaired. Furthermore, when used with acidic resins such as high acid number alkyd resins, the varnish obtained is unstable and tends to set up in storage.

It is an object of this invention to provide new surface coating resins.

A further object is to provide resins which may be admixed with other surface coating resins to improve the properties of the latter.

These and other objects are attained by reacting an aryl sulfonamide with melamine, formaldehyde and alcohols.

The following examples are given in illustration and are not intended as limitations upon the scope of this invention. Where parts are mentioned, they are parts by weight.

Example I

|  | Parts |
|---|---|
| Melamine | 100 |
| Santicizer 9[1] | 43 |
| Formalin (37% formaldehyde) | 463 |
| 92% butanol | 505 |

[1] Santicizer 9 is a trade name for a mixture of ortho and para toluene sulfonamides.

The melamine, Santicizer 9 and Formalin were placed in a reaction vessel and the pH of the mixture adjusted to about 8–9 with 5% aqueous sodium hydroxide. The mixture was refluxed at atmospheric pressure until the solution formed began to show slight cloudiness, (about 1 hour after the start of refluxing). At this point all of the butanol and sufficient 0.5 N formic acid to render the solution acid were added to the reaction mixture and refluxing at atmospheric pressure was continued for about 2 hours. The excess butanol and water were then removed by azeotropic distillation, dry butanol being added during the distillation, until the distillate contained but a single phase. The resulting solution was then concentrated under approximately 23 inches of mercury vacuum until the temperature of the solution reached about 98° C. Then xylol was added to obtain a solution containing 60% solids in a solvent comprising a 50–50 mixture of xylol and butanol. The resulting solution was clear and colorless and could be coated on various surfaces to produce a clear, colorless film. The resulting coating was extremely hard, had a very high gloss and was quite brittle.

Example II

Example I was repeated except that the Santicizer 9 was not added until after the reaction between melamine and the Formalin to make methylol melamine was completed. The resultant resin appeared to be slightly softer than that made by Example I, but otherwise was identical with it.

Example III 50 parts of benzene sulfonamide were substituted for the Santicizer 9 shown in Example I. The reaction proceeded as described in Example I and a clear, colorless resin solution was obtained from which a clear, colorless film was cast to provide a hard, brittle film having a high gloss.

Example IV

|  | Parts |
|---|---|
| Melamine | 100 |
| Para toluene sulfonamide | 43 |
| Formalin | 463 |
| Methanol | 505 |

The melamine, para toluene sulfonamide and Formalin were refluxed at atmospheric pressure at a pH of approximately 8–9 obtained with 5% aqueous sodium hydroxide until the reaction medium began to be cloudy. At this point, the methanol was added and the solution was made slightly acid by the addition of formic acid. The resultant mixture was refluxed at atmospheric pressure for about 2 hours and then water and methanol were removed and separated by fractional distillation, the dry methanol being returned to the reaction vessel. In this example, it is not necessary to resort to azeotropic distillation. The product was a methanol solution of methylol melamine modified by para toluene sulfonamide and methanol.

In contrast to many of the commercial methylol melamine-alcohol condensation products, the products obtained in the examples were compatible in all proportions with alkyd resins in general to improve their hardness, surface gloss and resistance to weathering and chemicals. The present products also showed an increased compatibility with other surface coating materials such as cellulose derivatives, phenolic resins, etc.

The aryl sulfonamides shown in the examples may be replaced in whole or in part by other aryl sulfonamides such as ring-substituted benzene sulfonamides in which the substituent on the ring may be an alkyl group. The amount of aryl sulfonamide used may be varied over a wide range. As little as $\frac{1}{10}$ of a mol per mol of melamine may be used and the amount of aryl sulfonamide may be increased to more than 1 mol per mol of melamine. A preferred range to obtain advantageous surface coating resins is from about 0.2 to 0.4 mol of aryl sulfonamide per mol of melamine.

The amount of formaldehyde used may vary from 1 mol per mol of melamine to 6 or more mols per mol of melamine.

Butanol and methanol were disclosed in the examples as alcohols to be reacted with the methylol melamine. They may be substituted in whole or in part by other alcohols and substituted alcohols including aliphatic, cycloaliphatic, aromatic, nitro, and amino alcohols, such as ethanol, propanol, isopropanol, pentanols, octanols, lauryl alcohol, cetyl alcohol, stearyl alcohol, cyclohexanol, benzyl alcohol, cinnamyl alcohol, allyl alcohol, 2-nitro-1-butanol, 2-nitro-2-methyl-1-propanol, 2-nitro-2-methyl-1,3 propane diol, 2-nitro-2-ethyl-1,3-propane diol, tris (hydroxy methyl) nitro methane, 2-amino-1-butanol, 2-amino-2-methyl-1-propanol, 2-amino-2-methyl-1,3-propane diol, 2-amino-2-ethyl-1,3-propane diol, tris (hydroxy methyl) amino methane, etc. Mixtures of two or more alcohols may be used if desired.

The pH of the reaction mixture should be kept on the alkaline side, about 8–9, until the reaction between melamine and formaldehyde to form methylol melamines is substantially completed. At this point the pH should be adjusted to the acid side. Various acids such as formic acid, acetic acid, hydrochloric acid, phosphoric acid, etc. may be used to create the acid pH. The reaction may also be carried out at temperatures lower than the reflux temperature, for example, 25 to 40° C. to obtain essentially monomeric low molecular weight resins, if desired.

The solutions produced by the process of this invention as illustrated in the examples may be diluted with other surface coating solvents or thinners such as dipentene, butyl cellosolve, phenyl cellosolve, dibutyl phthalate, benzene, toluene, etc. If the presence of butanol, methanol, or other low boiling solvent is objectionable, they may be removed from the solutions by vacuum distillation and the resin thus obtained may be then dissolved in higher boiling solvents and thinners.

The resins of this invention may be used as a surface coating resin alone or modified by conventional additives such as natural or synthetic resins or other materials, including copal, kauri, gum tragacanth, methoxy cellulose, casein, etc., and dyes, pigments, lakes, fillers, etc.

The resins of this invention are especially advantageous for use in modifying alkyd resins for surface coatings. They are compatible in all proportions with alkyd resins in general, including unsaturated alkyd resins and improve the color, hardness, gloss, chemical resistance and abrasion resistance of the alkyd resins without impairing the physical properties of the coatings derived therefrom. Such compositions are more specifically described and claimed in application Serial No. 718,270 filed Dec. 24, 1946, by myself and Frank J. Hahn.

The aryl sulfonamide modified melamine resins may be plasticized with low molecular polymers of α-methyl styrene to produce molding compounds having exceptionally high resistance to alkali. Such compounds are particularly useful in making washing machine agitators and other articles which are frequently in contact with alkaline solutions.

As shown above, the solvents may be removed from the resins of the present invention by vacuum distillation or other suitable means to produce materials which are solid and friable at ordinary temperatures. In this respect, the present resins are vastly different from the usual alkylated melamine-formaldehyde products which cannot be dried down to form hard, solid, friable resins without loss of solubility. The resins thus obtained may be mixed with various plasticizers, resins, drying and non-drying oils, etc. The resins or mixtures may be used for laminating, textile treating or the like. If desired, they may be dissolved in suitable solvents prior to their use as laminating or textile treating agents.

The new resins may also be used in combination with urea, urea-melamine, melamine, thiourea and phenolic resins and may be incorporated in printing ink vehicles, oleoresinous varnishes, oils and oil varnishes, etc.

It is obvious that many variations may be made in the processes and products of this invention without departing from the spirit and scope thereof as defined in the appended claims.

What is claimed is:

1. A surface coating resin comprising the heat-reaction product of a methylol melamine-alcohol condensation product with an aryl sulfonamide taken from the group consisting of benzene sulfonamide and ring-substituted benzene sulfonamides wherein the substituent is an alkyl group, the ratio of said aryl sulfonamide to chemically combined melamine varying from 0.1 to 1 mol per mol of melamine.

2. A surface coating resin as in claim 1 wherein the aryl sulfonamide is a mixture of ortho- and para-toluene sulfonamides.

3. A surface coating resin as in claim 1 wherein the aryl sulfonamide is benzene sulfonamide.

4. A surface coating resin as in claim 1 wherein the aryl sulfonamide is para-toluene sulfonamide.

5. A surface coating resin as in claim 1 wherein the ratio of aryl sulfonamide to chemically combined melamine varies from 0.2 to 0.4 mol per mol of melamine.

6. A process for producing a surface coating resin which comprises reacting together under alkaline conditions melamine, formaldehyde and an aryl sulfonamide taken from the group consisting of benzene sulfonamide and ring-substituted benzene sulfonamides in which the substituent is an alkyl group, the molar ratio of melamine to aryl sulfonamide varying from 1:0.1 to 1:1 and then reacting the product with an alcohol under acid conditions.

7. A process as in claim 6 wherein the aryl sulfonamide is benzene sulfoamide.

8. A process as in claim 6 wherein the aryl sulfoanmide is para-toluene sulfonamide.

9. A process as in claim 6 wherein the aryl sulfonamide is a mixture of ortho- and para-toluene sulfonamides.

10. A process as in claim 6 wherein the molar ratio of melamine to aryl sulfonamide varies from 1:0.2 to 1:0.4.

11. A coating composition comprising the heat reaction product of a methylol-melamine-alcohol condensation product with an aryl sulfonamide taken from the group consisting of benzene sulfonamide and ring-substituted benzene sulfonamides in which the substituent is an alkyl group, the ratio of combined melamine to aryl sulfonamide being 1 mol of melamine to 0.1 to 1 mol of aryl sulfonamide, said resin being dissolved in an organic solvent.

MILTON J. SCOTT.

REFERENCES CITED

The following references are of record in the file of this patent:

UNITED STATES PATENTS

| Number | Name | Date |
| --- | --- | --- |
| 2,197,357 | Widmer | Apr. 16, 1940 |
| 2,320,817 | D'Alelio | June 1, 1943 |
| 2,326,725 | Jayne | Aug. 10, 1943 |
| 2,327,772 | D'Alelio | Aug. 24, 1943 |
| 2,331,376 | D'Alelio | Oct. 12, 1943 |
| 2,368,451 | D'Alelio | Jan. 30, 1945 |

FOREIGN PATENTS

| Number | Country | Date |
| --- | --- | --- |
| 104,382 | Australia | July 7, 1938 |